US006564047B1

United States Patent
Steele et al.

(10) Patent No.: US 6,564,047 B1
(45) Date of Patent: May 13, 2003

(54) ADVANCED AIR TIME MANAGEMENT

(75) Inventors: Scott Alan Steele, Lindenhurst, IL (US); Jeremy Jacobson, Crystal Lake, IL (US); Brett Murdock, Austin, TX (US); William P. Alberth, Jr., Crystal Lake, IL (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/648,776

(22) Filed: Aug. 28, 2000

(51) Int. Cl.$^7$ .............................................. H04M 11/00
(52) U.S. Cl. ........................ 455/405; 455/406; 455/418
(58) Field of Search .................................. 455/405, 406, 455/435, 418, 410, 407, 414, 411, 461, 430, 403, 428; 379/58, 93.03, 283, 361; 340/825.44

(56) References Cited

U.S. PATENT DOCUMENTS

| | | | | |
|---|---|---|---|---|
| 4,586,707 A | * | 5/1986 | McNeight et al. | 273/1 R |
| 5,297,189 A | * | 3/1994 | Chabernaud | 379/58 |
| 5,907,803 A | * | 5/1999 | Nguyen | 455/410 |
| 5,970,470 A | * | 10/1999 | Walker et al. | 705/14 |
| 5,991,623 A | * | 11/1999 | Ohta et al. | 455/435 |
| 6,026,291 A | * | 2/2000 | Carlsson et al. | 455/406 |
| 6,032,038 A | * | 2/2000 | Schroderus et al. | 455/405 |
| 6,049,712 A | * | 4/2000 | Wallinder | 455/114 |
| 6,091,944 A | * | 7/2000 | Friend | 455/409 |
| 6,246,756 B1 | * | 6/2001 | Borland et al. | 379/142 |

FOREIGN PATENT DOCUMENTS

WO     WO 97/44943     * 11/1997  ........... H04M/3/42

* cited by examiner

*Primary Examiner*—Daniel Hunter
*Assistant Examiner*—C. Chow
(74) *Attorney, Agent, or Firm*—Lalita P. Pace (57) ABSTRACT

A system and method of communications usage management for multiple networked devices such as cellular telephones in a telecommunications network. A management database is provided for storing communications attributes for at least one networked device. The stored communications usage attributes serve as criteria for regulating access of the networked devices to the system. The users of the devices may purchase a quantity of transferable units, such as usage minutes over the system network, with the units being redeemable for goods and/or services on the system, thus facilitating transfer of units between users. A user interface is provided as a system management device for accessing the management database to configure the communications usage attributes for defining the transfer and usage criteria. Communications usage software operable with the network devices computes usage times to provide an accounting of usage and regulation in accordance with the management database. In the described embodiment, short message service (SMS) traffic is used for messages between networked devices used by several users to purchase quantities of redeemable units for exchange, commercial activities, or recreation which may be facilitated through the system operator.

28 Claims, 4 Drawing Sheets

ADVANCED AIR TIME MANAGEMENT

BACKGROUND OF THE INVENTION

The present invention relates to a user interface communications usage management of multiple networked devices in a telecommunications network, and more particularly to cellular telephone air time management establishing criteria for allowing, forbidding, and limiting communications access with accounts for managing usage minutes.

Cellular telephones can be programmed to only originate calls to a fixed table of numbers, and telephones can be set up to only receive calls. However, current cellular telephones do allow the owner to lock out undesired services, and cellular telephone protocols have not been advanced for allowing a telephone to be set up for restricted access to a first list of numbers, and unlimited access to a second list of numbers, where the list is remotely determined by the owner/account manager.

While some internet service providers are providing free computers and internet service to consumers, the user must complete a personal and detailed survey, and the computer is configured with a banner which displays advertising targeted to the user. The user is required to use the computer for a specified number of hours per week. Similar services are not known for cellular communications, especially where the user is required to acknowledge the advertisement. Additionally, commoditization of usage minutes may be desirable to facilitate the exchange of usage minutes between users. Further, trading air time minutes for services or merchandise is somewhat similar to trading airline miles for services or merchandise.

Advanced air time management provides a feature that may be required as the number of cellular telephones per household increases. The feature can be tied to a business or family management system which can provide a user interface to allow the account manager to set up restriction on all his/her family telephones. An internet services provider (ISP) then may advantageously spawn system maintenance short message service (SMS) traffic to update the telephones, and record acknowledgments when the telephones are all recorded. The SMS messaging allows for sending and receiving short alphanumeric messages between mobile telephones. It would be advantageous to provide several related features to the ISP and the users, such as (1) additional features to market the subscriber/infrastructure equipment; (2) air time for advertising opens up the operator to pull in another revenue stream, which enables the operator to hook lower income individuals (like college students who will not always be low income) on their network; and (3) trading air time for acknowledged advertising allows advertisers to get feedback that their advertising dollars are working for them. Thus, the ISP and users will be allowed to transfer air time minutes from one account to another in view of defined business and use regulation incentives.

The time is rapidly approaching when all members of a family will have their own personal communication device. As this happens, the family bill payer will need new methods to regulate the usage of these communication devices. A method will be needed for easily restricting and limiting the usage for different members of a family (or group). The method really involved treating air time as a form of money. To this end, a communications system could be provided over a telecommunications network managed by a system operation in which multiple networked devices used by several users may purchase quantities of redeemable units for services and the like. Through the use of such redeemable units, the users may exchange units, and commercial or recreational activities may thus be facilitated through the system operator.

Advantageously, the foregoing revolves around the central notion of using air time as a form of currency units. A method of managing air time is thus desirable for a group or family, including individualized bins describing Restricted, Unrestricted, and Forbidden usage of each telephone in the group, where the restriction information is stored in the telephone, in the switch, or by the ISP. System maintenance may employ SMS messages from the "Account Manager" to permanently or temporarily change bin descriptions. Users may thus use SMS messaging to transfer air time to another user.

Methods are desired for sending advertisements to a user, recording an acknowledgment, and sending the acknowledgment back to the operator. This may be facilitated by having the telephone examine the beginning of all received SMS traffic for coded headers identifying the message as a command for the telephone. The SMS traffic may then modify the Family Air Time parameters with or without user acknowledgment, or operator intervention.

BRIEF DESCRIPTION OF THE DRAWINGS

The novel features of the believed characteristic of the invention are set forth in the appended claims. The invention itself, however, as well as the preferred mode of use, further objectives and advantages thereof, is best understood by reference to the following detailed description of the embodiments in conjunction with the accompanying drawings, wherein:

DETAILED DESCRIPTION OF THE PREFERRED EMBODIMENTS

Figure 1:
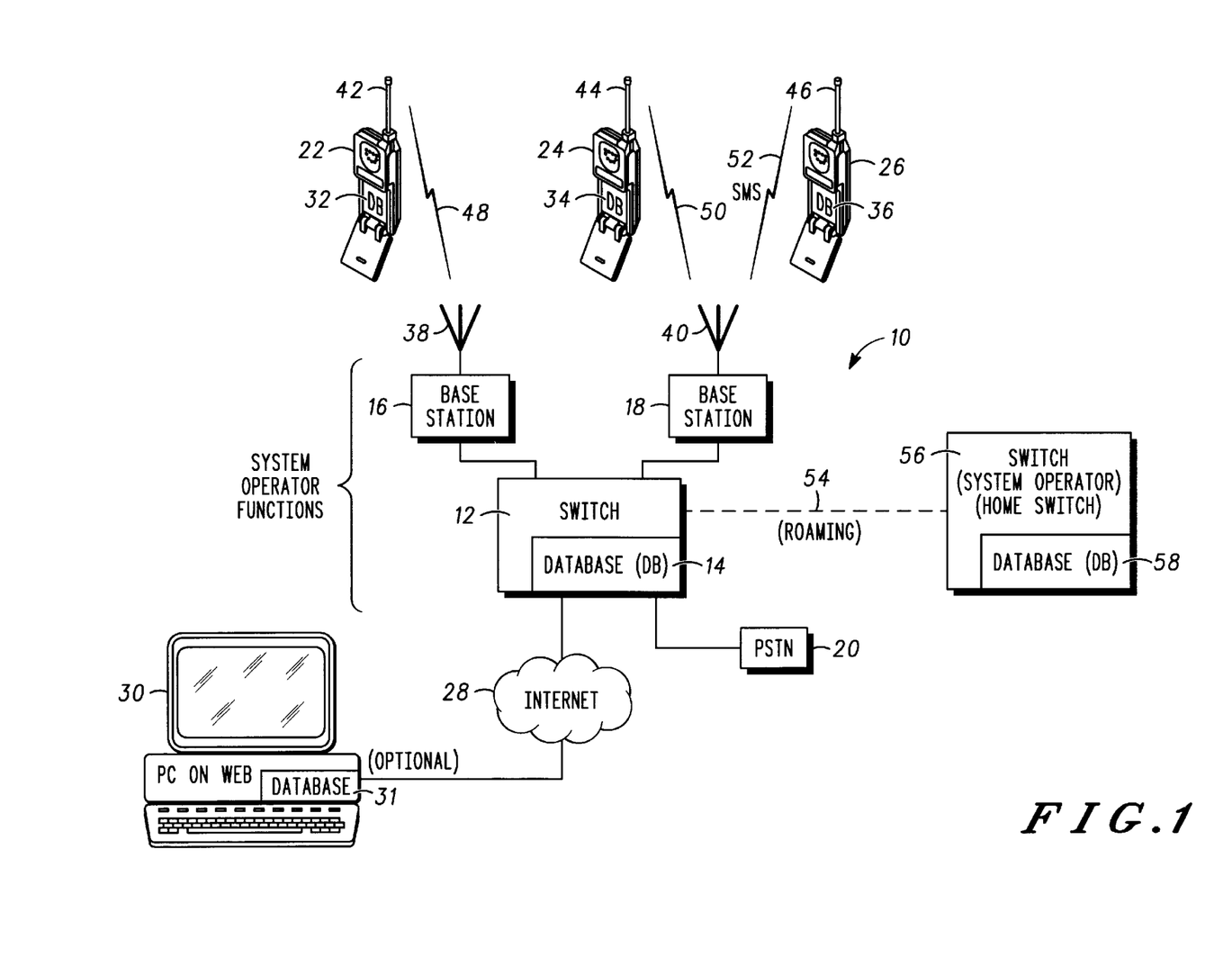
FIG. 1 is a block diagram illustrating air time management interfaces between telecommunications networks including a cellular telephone system controlled by a system operator in accordance with the invention.
Figure 2:
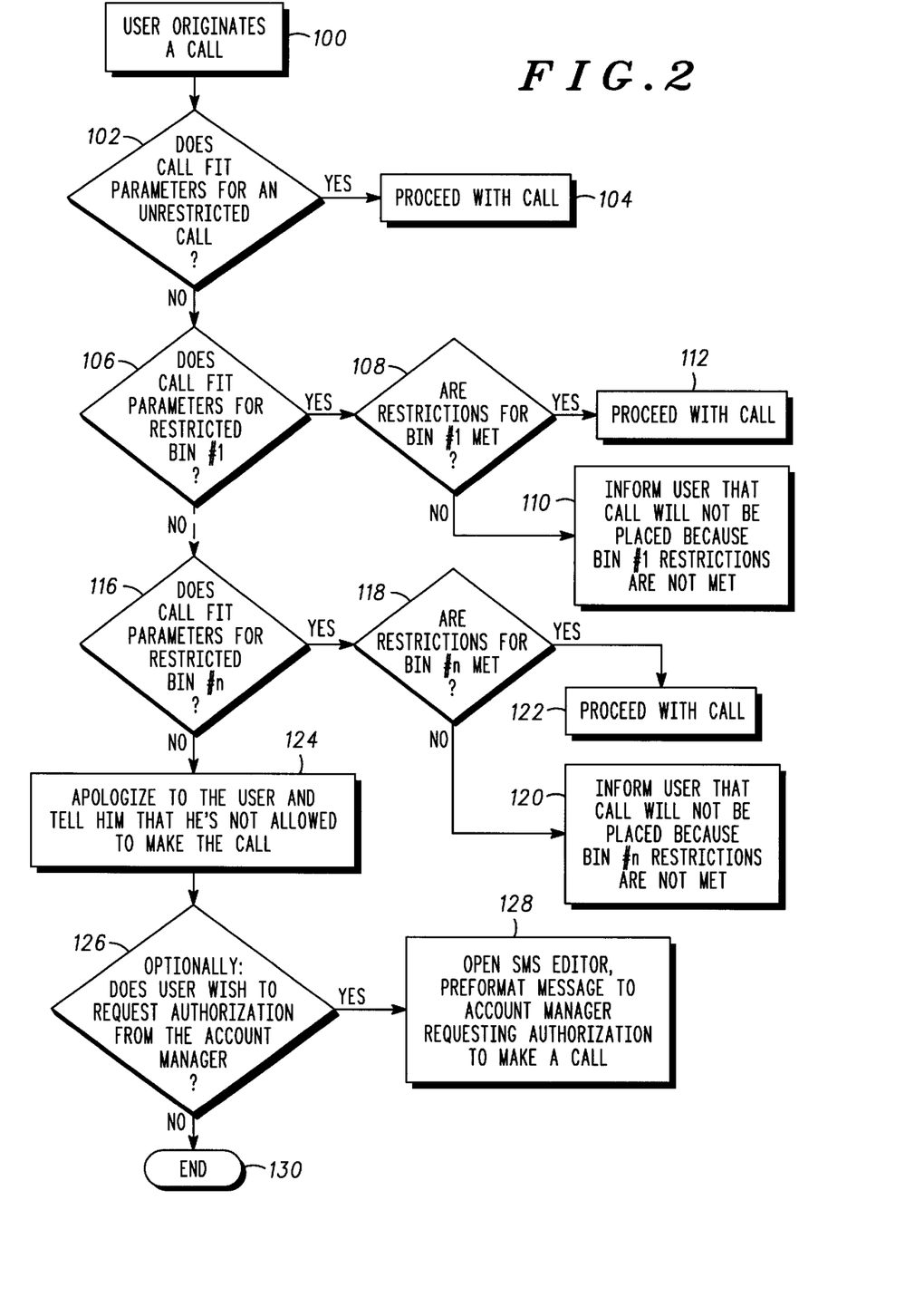
FIG. 2 is a flowchart showing origination with family/group air time management enabled.

With reference to FIGS. 1–2, and particularly FIG. 1, a block diagram is shown for illustrating an air time management interface between a telecommunications network 10 including a cellular telephone system controlled by a system operator in accordance with the invention. The system 10 of FIG. 1 provides the system operator functions which will be provided by commercial system operators such as Bell South, Sprint, AT&T Wireless, Verizon Wireless, and the like. A switch 12 is provided for facilitating the system operator functions within an area, in which there is typically a single switch with multiple base stations 16 and 18 in communication with the switch 12. The switch 12 includes a database (DB) 14 which identifies all of the users subscribing to the services of the system operator. Accordingly, when a user initiates a cellular telephone call, the database 14 is used to retrieve information such as the electronic serial-number and the like for comparison with the network communication device. As shown in FIG. 1, the cellular system 10 is provided with the base stations 16 and 18 in communication with cellular handsets 22, 24, and 26. The cellular handset may also be provided with a database 32, 34, and 36, respectively, which may be used with public key encryption for maintaining security and transaction between the cellular handsets 22, 24, and 26 in communication with the system operator base stations 16,18. As shown, antennas at 38 and 40 associated with the base stations 16 and 18, respectively. Additionally, antennas 42, 44, and 46 are associated with the cellular handsets 22, 24, and 26, respectively in communications with radio frequency communication paths 48, 50, and 52 which are provided for carrying cellular telephone traffic and SMS messaging. The SMS messaging may be provided for sending information between the handsets and/or the system operator base stations 16, 18 via the switch 12.

Accordingly, a management database may be provided with any of DBs 32, 34, or 36 for storing communications usage attributes for at least one networked device at 22, 24, or 26. The stored communications usage attributes may be used for defining a plurality of criteria regulating access of the at least one networked device 32, 34, or 36 to the telecommunications network 10. A user interface operable as the system management device, i.e., one of the cellular telephone handsets 22, 24, or 26 is provided for accessing the management database 14 on the switch 12 provided by the system operator to configure the communications usage attributes for defining a plurality of criteria of at least one network device 22, 24, or 26. To this end, communications usage software is provided as being operable, as discussed below in connection with FIGS. 2–4, with the at least one networked device 22, 24, or 26 of the telecommunications network 10. The communications usage software discussed herein provides for an accounting for usage and regulating the usage in accordance with the management database 14.

The switch 12 provided by the system operator, may be interfaced to a number of other communications networks, such as the public switch telephone network (PSTN) 20, the Internet 28, or a variety of other wide area computer networks interfaced with the database 14 of the switch 12. As shown, a personal computer (PC) 30 is provided as being resident on the worldwide web (WWW) which may also be provided with a database 31, optionally for configuring communications usage attributes as discussed above. Traditionally, in a situation where the networked device includes a cellular handset such as handsets 22, 24, or 26 in a remote location using the roaming capabilities of the cellular network 10, a communication link indicated in dashed line 54 may be provided between the switch 12 and a switch 56 associated with the home system operator. The system operator home switch 12 also provides a database 58 which identifies the user as a subscriber to the home system operator. Wide area networks used in communications include computer networks such as the Internet and represent a collection of computer resources, connected together by a series of communication protocols known as TCP/IP. Electronic data sources, such as conventional databases, the Internet (i.e., the World Wide Web ("WWW")) are a rich and important means of information retrieval and distribution and, increasingly, electronic commerce. Many sites on the Internet can be accessed in accordance with popular standard protocols or formats such as Hypertext Transport Protocol ("HTTP"). These sites act as remote servers, providing information to users' computers (or "clients") in accordance with a particular format or protocol. The client system (often an individual's personal computer) must have the necessary software to handle the server's particular protocol.

As described in connection with FIG. 1, at least a portion of the database may be distributed between database 14 and database 32, 34, and 36 as between the switch 12 and the cellular handsets 22, 24, and 26 for storing a portion of the database in at least one of the networked devices. With at least one of the networked devices, i.e., cellular handset 22, 24, or 26, the user may be provided with access via a user interface to the management database 14 to change entries in the management database. Likewise, one or more of the other networked devices 22, 24, or 26 may be prohibited from access to the management database, but may be provided limited access based on SMS messaging to acquire authorization for changing entries in, e.g., databases local to the handset, i.e., database 32, 34, or 36. Thus, at least one network device has at least one corresponding entry in the management database and a second network device that has at least one corresponding entry in the management database and facilitates the user of the first network device to authorize transfer from at least one corresponding entry in the management database to another entry in the management database corresponding to a second network device.

To facilitate the transfer, as discussed herein, public key data encryption algorithms may be employed, as presently being used in commercial applications for protecting computer networks such as internet interactive communications between a customer and a merchant. Herein security mechanisms may be employed with a digital envelope occupied by a message body, encrypted with algorithms using a message key generated to increase security of the overall system. The message key is then encrypted with the recipient's public encryption key and two parts are sent in a single digital envelope. The recipient of the digital envelope uses a private decryption key to extract the message, which in turn decrypts the body of the message. Digital envelopes work well for store and for word messaging environments for file encryption to facilitate PGP public key encryption algorithms. Once the user has been authenticated, an electronic fund transfer system or the like may be used for transferring redeemable units for products or services, such as cellular air time, with instructions for achieving the authentication for requested transfers. In addition to the public key cryptography, digital certificates may also be employed for use in such commercial transactions.

The described embodiment contemplates an encoded encryption key associated with the source identifier data string provided with SMS messaging, which may be transposed with information processing capabilities on remote devices. An encryption key is used to encrypt information specific to a user, and the encrypted user information may be assembled within a computer file transfer request word and transmitted to the remote device. For example, an encryption key appropriate for public or private key encryption may be embedded in transferred data. An appropriate software routine in the user's computer utilizes the key after decoding it in order to encrypt certain data being sent. For example, the encryption of credit card information is desired in order to thwart would-be intruders from misappropriating the information. Likewise, the system 10 of the described embodiment could be used to allow the user to exchange transferrable units such as usage minutes, already resident in the user's computer memory, and encrypting it with the key decoded from the code. In addition, the encoded security data may be used for use in secure data transmissions for electronic commerce over computer networks. The code may also include security information useful in completing secure transfers across the Internet.

Accordingly, the communications system 10 includes a multiple network communications devices each having at least one user that may purchase a quantity of units being redeemable for goods and/or services on the communications system, and further providing for the selective transfer of the redeemable units between users. As contemplated herein, the communications system 10 may be used to support a wide variety of exemplary applications such as the transfer of service usage minutes between entities of a user, games, and a variety of other applications. Accordingly, in connection with the telecommunications system 10, a number of examples are provided herein.

As discussed below in connection with TABLE 1, a business or a family entity may purchase a block of air time for the entire customer entity, and then dynamically allocate the air time minutes based on the needs and desires of the group. Each communication device in, e.g., the family, would have three or more "bins" of associated air time.

An UNRESTRICTED bin, which would include all telephone numbers and internet addresses which the user may access on an unrestricted basis. This could include emergency numbers, school internet address, all family numbers, parents work numbers, etc.

One or more RESTRICTED bins, which would include telephone numbers and addresses which the user has limited access to. This could include local calls, favorite game URL's, etc. The restrictions could be time based (calls are allowed or prohibited during specific times of the day), or air time based (user is allowed to use the restricted bin for a specific number of air time minutes). Each bin would also have a flag to allow soft or hard restriction. A hard restriction would terminate the call when the air time or time limits are exceeded (with user warnings at one minute). A soft limit would allow the user to finish the call unmolested, but would prohibit further calls. After denying origination of a telephone call to a user, having the telephone preformat an SMS to the account manager requesting authorization to make the call.

A FORBIDDEN bin, which would define calls that the user is prohibited to use without special authorization. This bin could include long distance calls, international calls, 900 numbers, a favorite game website while junior is grounded, etc. Authorization methods for the communications system are discussed below in connection with FIGS. 2–4.

EXAMPLE 1

Family Air Time Management

A family of four (Mom, Dad, Son, Daughter) all have cellular telephones. Mom pays the bills and purchases a block of air time (at volume discount) for the family. Mom wants to allow/restrict the following usage:

Son and daughter can call anyone in the family at any time.

Son and daughter have unlimited access to the school website.

Son and daughter have no access to long distance calls, except daughter has unlimited access to call Grandma (a long distance call). Daughter and Grandma have a relationship, and Mom does not want to restrict it.

Daughter is given a fixed number of minutes for other local calls.

Son is given a fixed number of minutes for local calls, and a second fixed limit for playing games.

Daughter has unlimited data access, but Son is restricted to sites in a list (Son has previously surfed sites Mom does not approve of).

Mom and Dad have unlimited access to data and local calls.

Mom and Dad have restricted access to long distance calls (Mom is trying to keep the telephone bill under control).

Mom sets up the telephones as follows:

TABLE 1

| | Unrestricted | Restricted Bin #1 | Restricted Bin #2 | Forbidden |
|---|---|---|---|---|
| Daughter's Telephone | Emergency numbers (911), all family home, cell, and work numbers, school URL address, Grandma's long distance number (Daughter and Grandma get along.) | All local voice calls, data calls. Allocated 200 minutes per week. Hard restriction. | Not Used | Long distance International 900 calls |
| Son's Telephone | Emergency numbers (911), all family home, cell, and work numbers, school URL address | All local voice calls. Allocated 50 minutes per week. Hard restriction. | Data calls to 10 URLs (favorite game sites). Allocated 240 minutes per week. Hard restriction. | International, Long distance, 900 calls. Data calls not allowed in another bin (Son is surfing sites Mom does not approve of). |
| Dad's Telephone | All local voice and data calls. | Long Distance. Allocated 50 minutes per month. Soft restriction. | Not Used | International |
| Mom's Telephone | All local voice and data calls. | Long Distance. Allocated 200 minutes per week. Soft restriction. | Not Used | International |

Hard Restriction gives a warning when one minute is remaining, terminates call when time expires.
Soft Restriction gives a warning when time expires. Does NOT terminate the call. Prohibits new calls after time expires.

Restrictions information can be managed in the telephone or in the switch. If it is managed in the switch, this becomes a feature operators can charge for, regardless of where the database is stored. The "account manager" (Mom for the above example) should be capable of permanently or temporarily modify the database with a SMS.

If Son does not clean his room, Mom should be able to shut down his gaming privileges (turn off Restricted bin 2) until he complies. if daughter is planning a big party and needs more local call time (Restricted bin 1), she should be able to SMS Mom pleading her case. Mom can respond and grant more time if she is feeling benevolent.

With reference to the program flowchart of FIG. 2, a decision tree is provided for call origination which provides a set of rules residing in the network telecommunications devices and the public switch telephone network (PSTN) switch. Accordingly, a system for communications usage management of multiple networked devices, such as cellular telephones and the like, in the telecommunications network provides management of a database for storing communications usage attributes for each networked device. As discussed further, the stored communications usage attributes define a plurality a criteria for allowing, forbidding, and limiting access of each networked device to the telecommunications network. As indicated at 100, the user originates a call, e.g., a telephone call from a cellular radio handset, which has associated call parameters for comparison to determine whether the originated call is an unrestricted call at decision 102. If the call parameters indicate a nonrestricted call, the call proceeds at step 104, otherwise where the call parameters are indicative of a restricted call, decision blocks 106 determines whether the call corresponds to parameters for one of the plurality of restricted bins.

Accordingly, the user interface of the multiple network devices in the telecommunications network provides an operable interface with at least one networked device as a system management device for accessing the management database to configure the communications usage attributes for defining the plurality of criteria of the other networked devices. Herein, the management database provides a data structure for organizing the plurality of criteria into a plurality of bins of air time associated with each network device according to an unrestricted bin, a restricted bin, and a forbidden bin or the like. Accordingly, decision block 106 corresponds to bin 1 while a plurality of decision blocks thereunder may be corresponding to N bins as indicated at decision block 116 discussed further below. Thus, the N bins associated with the decisions for determining whether call parameters are associated with restricted bins may correspond to unrestricted bins, restricted bins, and forbidden bins or the like. As discussed, restricted bin decision corresponding to blocks 106 and 116 may correspond to numerous such decisions as indicated by the dashed line 114.

Where the call at 106 is indicated as corresponding to restricted bin 1, step 108 determines whether the restrictions for bin 1 are met. If the restrictions are not met, the user is informed that the call cannot proceed at step 110. Otherwise the call is completed at step 112. Similarly, for the identified restriction associated with bin N at 116, the determinations for proceeding with the call are similarly provided at step 118 to determine whether the restrictions are met, informing the user at step 120, or proceeding with a call at step 122.

Where restricted calls are identified, however, and the criteria associated with the restriction cannot be met, step 124 issues a notice to the user indicating that the call cannot be made. Then at step 126 options are provided for the user to request authorization from the account manager, from which the system management SMS editor may be opened to provide a preformatted message to the account manager to request authorization and make the telephone call at 128. However, if the request is not provided by the user, the routine ends its operation and returns at step 130.

Figure 3:
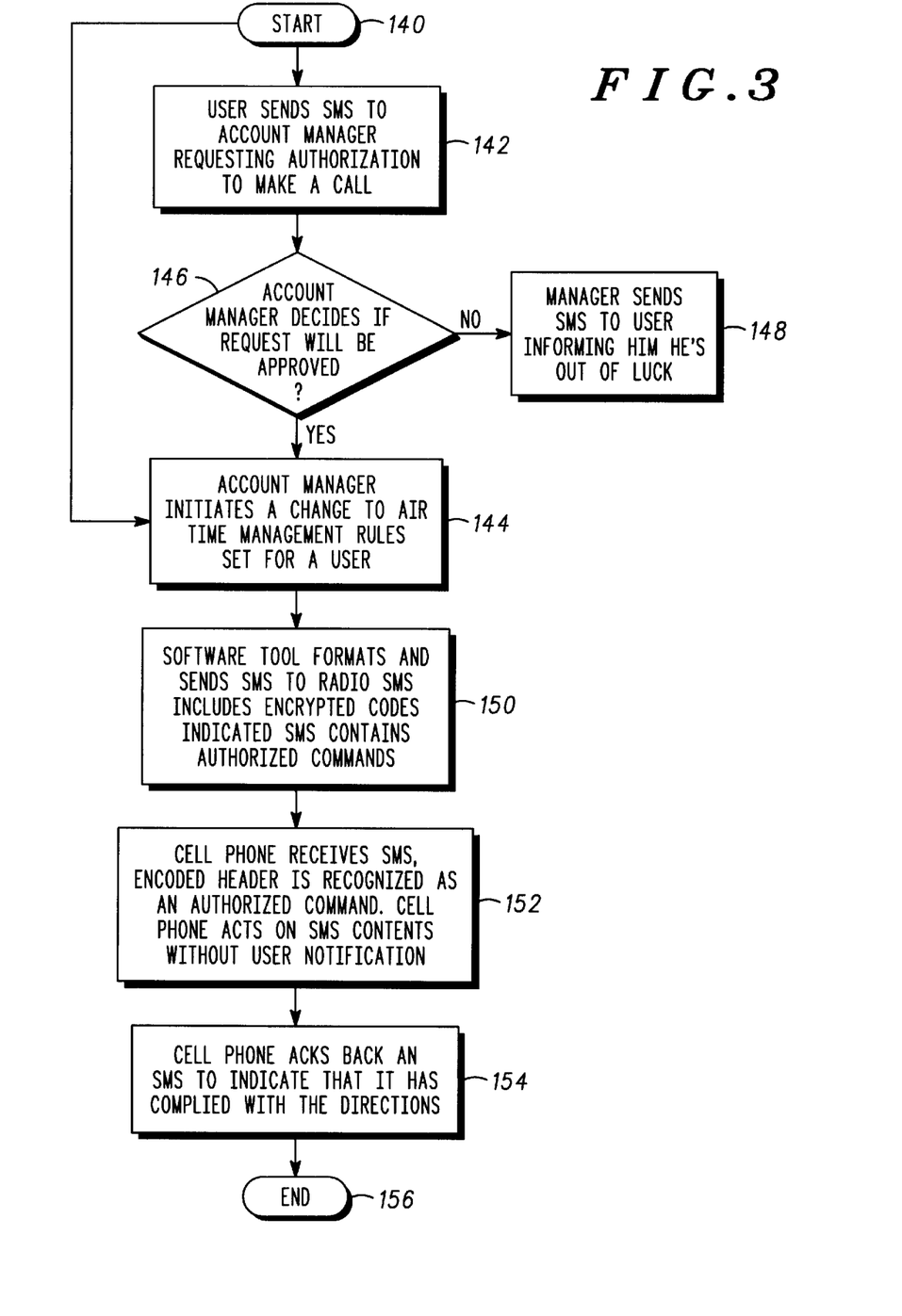
FIG. 3 is a flowchart showing rules change authorization using SMS traffic.

With reference to FIG. 3, the flow chart starting at step 140 describes the system management SMS traffic for authorizing changes to the rules set for the communications usage attributes stored in the management database. As discussed above, the associated rules may be provided with either or both of the multiple network devices or the telecommunications network switch equipment. From step 140, the change request initiation is determined as between the user at 142 or the account manager at 144. Before the user sends the SMS message to the account manager requesting authorization to make the call at 142, the account manager provides the input decision to determine whether the call requested will be approved at step 146, after which the account manager initiates the changes to the air time management rules at 144. Whether the account manager denies the request for the call authorization, step 148 provides a message sent from the manager to the user informing that the call services has been denied. At step 150 the software formats and sends the SMS air time management information to the networked device, which includes encryptic codes indicating authorization. Then, step 152 provides processing of the authorization commands which allows the telephone to act on the SMS contents without user authorization. The device then acknowledges that it has complied with the stored communications usage attributes at step 154 and a return from the SMS traffic authorization is provided at step 156.

Figure 4:
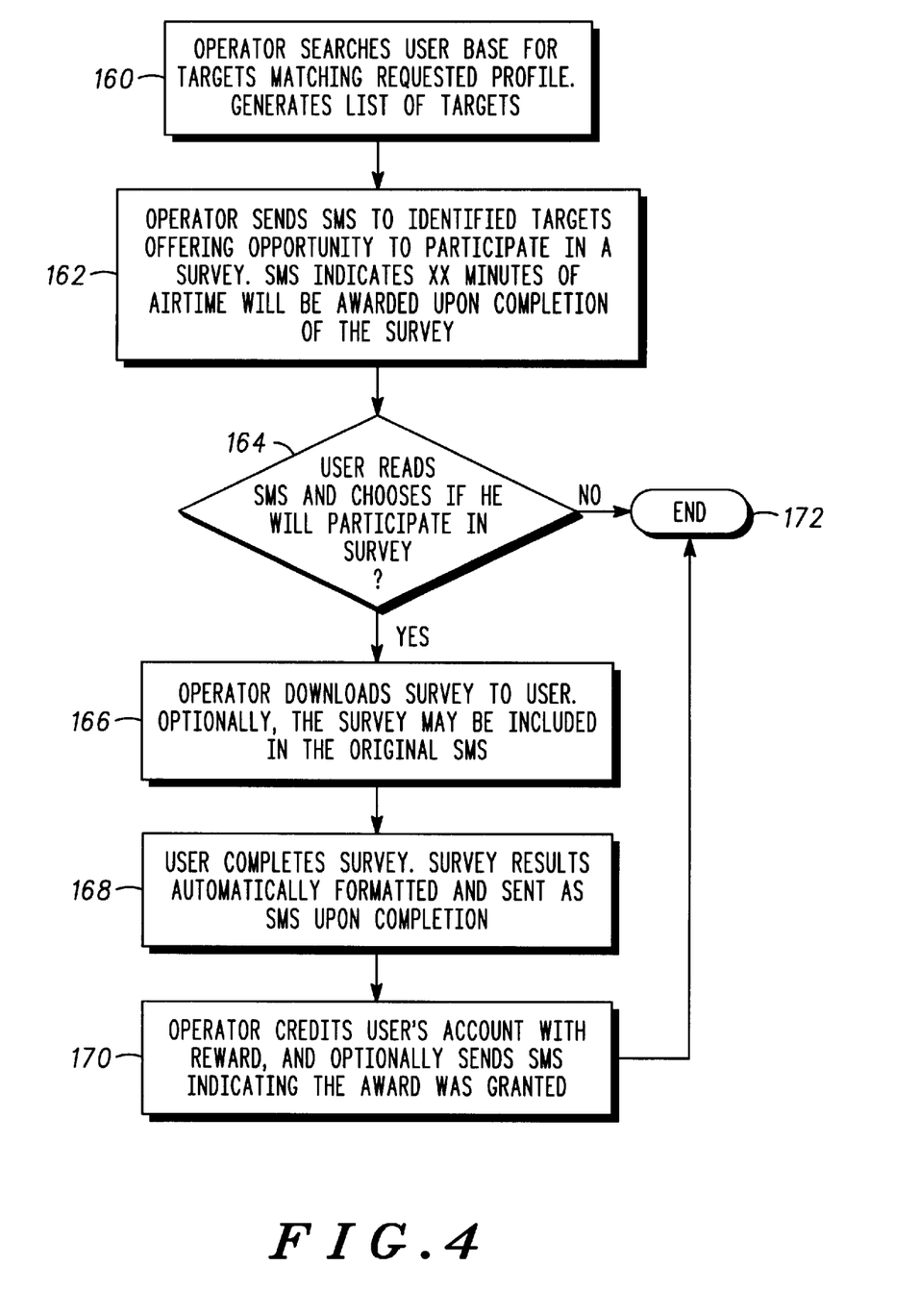
FIG. 4 is a flowchart showing survey completion for air time reward.

In connection with the flow chart of FIG. 4, the communications usage software and the management database may be searched for providing marketing information in addition to computing the communications usage times associated with the accounting function. Herein, step 160 allows a system operator to search the user database for predetermined customer user profiles in order to generate a list of target users. At step 162 the operator sends the system management SMS information to identified targets offering opportunities to participate in various marketing activities such as surveys, and providing the ability to acquire usage minutes for compliance with the criteria set by the system operator. At step 164 the user is provided with an option for participation in the promotional activity, and the user, having indicated an affirmative response, receives the operator download of the survey, which may also be provided with the original SMS information at step 166. User compliance with the survey is determined at step 168 from which survey results are automatically formatted and sent as an SMS message upon completion. At step 170 the operator credits the user's account with the incentive reward, e.g., usage minutes, and optionally sends the SMS indicating that the award was granted. Program flow then terminates at step 172 either upon completion of the survey or a negative response to the survey by the user at step 164.

EXAMPLE 2

Survey Participation in Exchange for Air Time

Operators have some demographic information on the users and perhaps location information. Thus, the operators may offer tightly focused survey opportunities to marketing groups. User would receive an SMS offering an opportunity to participate in a survey. Specifically, several marketing/survey techniques may be employed, such as:

Marketing organization pays a fee to solicit surveys from Cellular Operator's customer base. Marketing organization specifies demographics (including location if available) of targets.

Operator searches user database for customers which fit the profile. Targets are sent SMS (during off-peak time) to inquire if user would be willing to take a survey. Customer is offered air time minutes as a reward for completing the survey.

Customer can acknowledge SMS and agree to take survey.

Customer can also ignore offer, or customer may sign up for a more expensive call pack that removes their name from the eligible database.

Customer complete survey and has his/her account credited with the offered minutes.

EXAMPLE 3

Air Time Minutes for Reading Advertisements

Operators can offer discounted call packs to individuals who agree to receive and read targeted advertisements. Operators can sell the quality advertising time which can be highly targeted to the user. User is required to acknowledge the advertisement, which should increase the rate the operator can charge for advertising.

In this case, users on fixed income may want cellular telephone service and thus agree to subject themselves to advertising for reduced call pack rate. The user completes detailed personal survey when he/she signs up for service. Then the operator sells advertising space, and sends advertisements to user. Advertisements are sent at off-peak hours. User may be required to leave telephone on one night per week (download at night). The user is required to acknowledge advertisements individually as part of call pack, and the operator tracks acknowledgments. If appropriate number of acknowledgments is not made, user gets billed a higher rate.

EXAMPLE 4

Air Time Minutes for Responding to Advertisements

Upon receiving an advertisement (over the cell net or Bluetooth) and acknowledging the advertisement at the vendor's establishment, the user receives an air-time reward credited to his/her account. This gives vendor feedback on how well the advertising is pulling the user into his store. Accordingly, the user receives an advertisement, and then stores the advertisement away. Then the user may visit advertising vendor's establishment and enters the vender Bluetooth wireless network. The user pulls up the saved advertisement, and electronically acknowledges it. Then the Bluetooth unit sends message over landline net to operator requesting cellular telephone user's account be credited with X minutes of air time. Alternately, the Bluetooth unit can send a coded message to the cellular telephone, which can be forwarded to the operator for air time credit.

EXAMPLE 5

Air Time for Merchandise/Service

Users may also be allowed to purchase items (e.g., promotional caps, T-shirts, etc.) or services (add three months of call waiting, download an MP3 file) in exchange for minutes from user's account.

While the foregoing described embodiments have been set forth above, it will be appreciated to one skilled in the art that the inventions described have applications beyond the described embodiments. Accordingly, it is intended that the scope of the invention including such alternatives, modifications, and variations contemplated shall be defined by the appended claims.

What is claimed is:

1. A system for communications usage management of multiple networked devices in a telecommunications network, comprising:

a management database for storing communications usage attributes for at least one networked device, the stored communications usage attributes defining a plurality of criteria regulating access of the at least one networked device to the telecommunications network, wherein said management database provides a data structure for organizing the plurality of criteria into a plurality of bins of air time associated with each networked device, and wherein a limited access associated with at least one bin of said plurality of bins of air time is time based for regulating communications during a predefined period of time, wherein at least one person is authorized to change entries in the management database;

a user interface operable as a system management device for accessing the management database to configure the communications usage attributes for defining the plurality of criteria of the at least one networked device; and communications usage software operable with the at least one networked device for computing the communications usage time for each networked device on the telecommunications network, said communications usage software providing an accounting of usage and regulating the usage in accordance to the management database, wherein when the at least one networked device attempts communications not allowed by the communications usage software, the at least one networked device facilitates sending a message to at least the at least one person authorized to change entries in the management database.

2. A system as recited in claim 1, wherein said management database provides a data structure for organizing the plurality of criteria into a plurality of bins of air time associated with each networked device according to an unrestricted bin, a restricted bin, and a forbidden bin.

3. A system as recited in claim 2, wherein said management database associates the unrestricted bin with communications which the user may access on an unrestricted basis.

4. A system as recited in claim 2, wherein said management database associates the restricted bin with communications to which the user has limited access.

5. A system as recited in claim 4, wherein said management database comprises a plurality of restricted bins.

6. A system as recited in claim 2, wherein said management database comprises a forbidden bin defining communications which the user is prohibited from using in the absence of special authorization.

7. A system as recited in claim 1, wherein said user interface comprises a cellular telephone wireless interface to the cellular telecommunications network.

8. A system as recited in claim 1, wherein said user interface comprises a computer interface in communication with a network.

9. A system as recited in claim 8, wherein said user interface comprises an internet link.

10. A system as recited in claim 2, wherein said communications usage software is operable with each networked device for computing the usage minutes associated with each of the bins of allocated air time for each networked device.

11. A system as recited in claim 1, wherein at least a portion of the database is stored in the at least one networked device.

12. A system as recited in claim 1, wherein the at least one person can use a networked device to change entries in the management database.

13. A system as recited in claim 11, wherein the attempted communication is allowed to proceed with permission from the at least one person authorized to change entries in the management database.

14. A system as recited in claim 11, wherein the at least one network device has at least one corresponding entry in the management database, the system further comprising a second network device that has at least one corresponding entry in the management database, wherein the user of the first at least one network device authorizes transfers from the at least one corresponding entry in the management database to the at least one entry in the management database corresponding to the second network device.

15. A method of communications usage management for multiple networked devices in a telecommunications network, comprising:

storing communications usage attributes in a management database for each networked device, the stored communications usage attributes defining a plurality of criteria for allowing, forbidding, and limiting access of each networked device to the telecommunications network, wherein said plurality of criteria comprises a plurality of bins of air time associated with each networked device, and wherein at least one bin of time is limited by a predefined time period, allowing or prohibiting communications therein;

interfacing at least one networked device as a system management device operable for accessing the management database to configure the communications usage attributes for defining the plurality of criteria of others of the multiple networked devices; and computing the communications usage time for each networked device on the telecommunications network with communications usage software operable with each networked device to provide an accounting of usage minutes for each of the stored communications usage attributes with respect to each of the criteria for allowing, forbidding, and limiting access of each networked device to the telecommunications network, wherein multiple devices, each corresponding to at least one user may purchase a quantity of units, the units being redeemable for services on the communication system, wherein a user may cause units to be transferred to another user.

16. A method as recited in claim 15, wherein said storing step organizes the plurality of criteria in a data structure of the management database to provide a plurality of bins of air time associated with each networked device according to an unrestricted bin, a restricted bin, and a forbidden bin.

17. A method as recited in claim 16, wherein said storing step associates the unrestricted bin with communications which the user may access on an unrestricted basis.

18. A method as recited in claim 16, wherein said storing step associates the restricted bin with communications to which the user has limited access.

19. A method as recited in claim 18, wherein said storing step stores a plurality of restricted bins.

20. A method as recited in claim 16, wherein said storing step defines a forbidden bin for communications which the user is prohibited from using in the absence of special authorization with the interfacing step.

21. A method as recited in claim 16, wherein said computing step computes the usage minutes associated with each of the bins of allocated air time for each networked device.

22. A method as recited in claim 15, wherein the communication system supports games between a plurality of users, and airtime minutes are used as prizes in the games.

23. A method as recited in claim 22, wherein at least one of the users participating in the game is the communication system operator of the telecommunications network.

24. A system for communications usage management of multiple networked devices in a telecommunications network, comprising:

means for storing communications usage attributes in a management database for each networked device, the management database using the communications usage attributes for defining a plurality of criteria for allowing, forbidding, and limiting access to each networked device to the communications network, wherein said plurality of criteria comprises a plurality of bins of air time associated with each networked device, and wherein at least one bin of time is limited by a predefined time period, allowing or prohibiting communications therein;

means for interfacing at least one networked device as a system management device operable for accessing the storing means to configure the communications usage attributes for defining the plurality of criteria of others of the multiple networked devices; and means for computing the communications usage time for each networked device on the telecommunications network with communications usage software operable with each networked device to provide an accounting of usage minutes for each of the stored communications usage attributes with respect to each of the criteria for allowing, forbidding, and limiting access of each networked device to the communications network.

25. A system as recited in claim 24, wherein said means for storing provides a data structure for organizing the plurality of criteria into a plurality of bins of air time associated with each networked device according to an unrestricted bin, a restricted bin, and a forbidden bin in the management database.

26. A system as recited in claim 24, wherein said means for interfacing comprises a cellular telephone wireless interface to the cellular telecommunications network.

27. A system as recited in claim 24, wherein said user interface comprises an internet computer interface via the telecommunications network.

28. A system for communications usage management of multiple networked devices in a telecommunications network, comprising:

a management database for storing communications usage attributes for at least one networked device, the stored communications usage attributes defining a plurality of criteria regulating access of the at least one networked device to the telecommunications network, wherein at least a portion of the database is stored in the at least one networked device;

a user interface operable as a system management device for accessing the management database to configure the communications usage attributes for defining the plurality of criteria of the at least one networked devices; and communications usage software operable with the at least one networked device for computing the communications usage time for each networked device on the telecommunications network, said communications usage software providing an accounting of usage and regulating the usage in accordance to the management database, wherein when the at least one networked device attempts communications not allowed by the communications usage software, the at least one networked device facilitates sending a request to at least one designated networked device authorized to change entries in the management database.

\* \* \* \* \*